Dec. 17, 1968
H. W. HILYARD
3,416,588
TIRE CHANGING MACHINE
Filed July 28, 1966
2 Sheets-Sheet 1
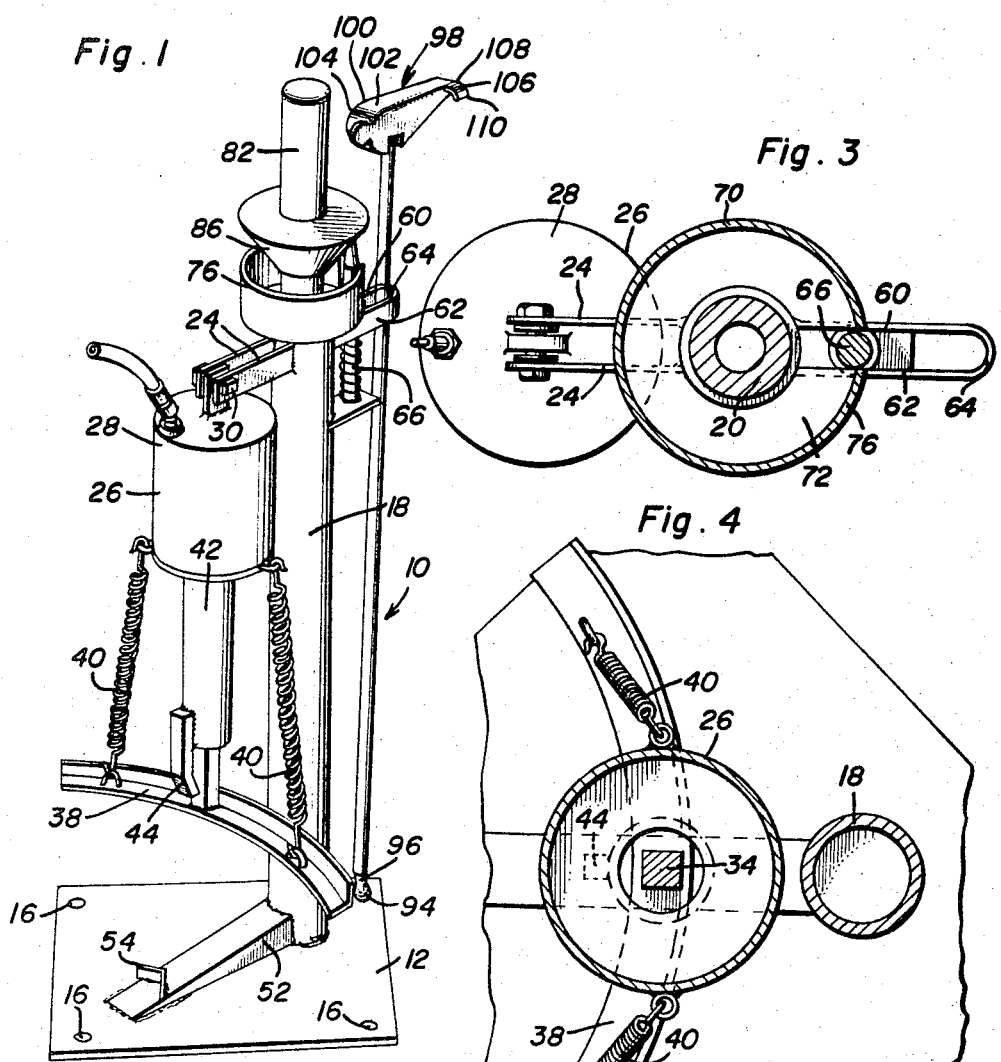
Harold W. Hilyard
INVENTOR.
BY Dec. 17, 1968  H. W. HILYARD  3,416,588
TIRE CHANGING MACHINE
Filed July 28, 1966  2 Sheets-Sheet 2
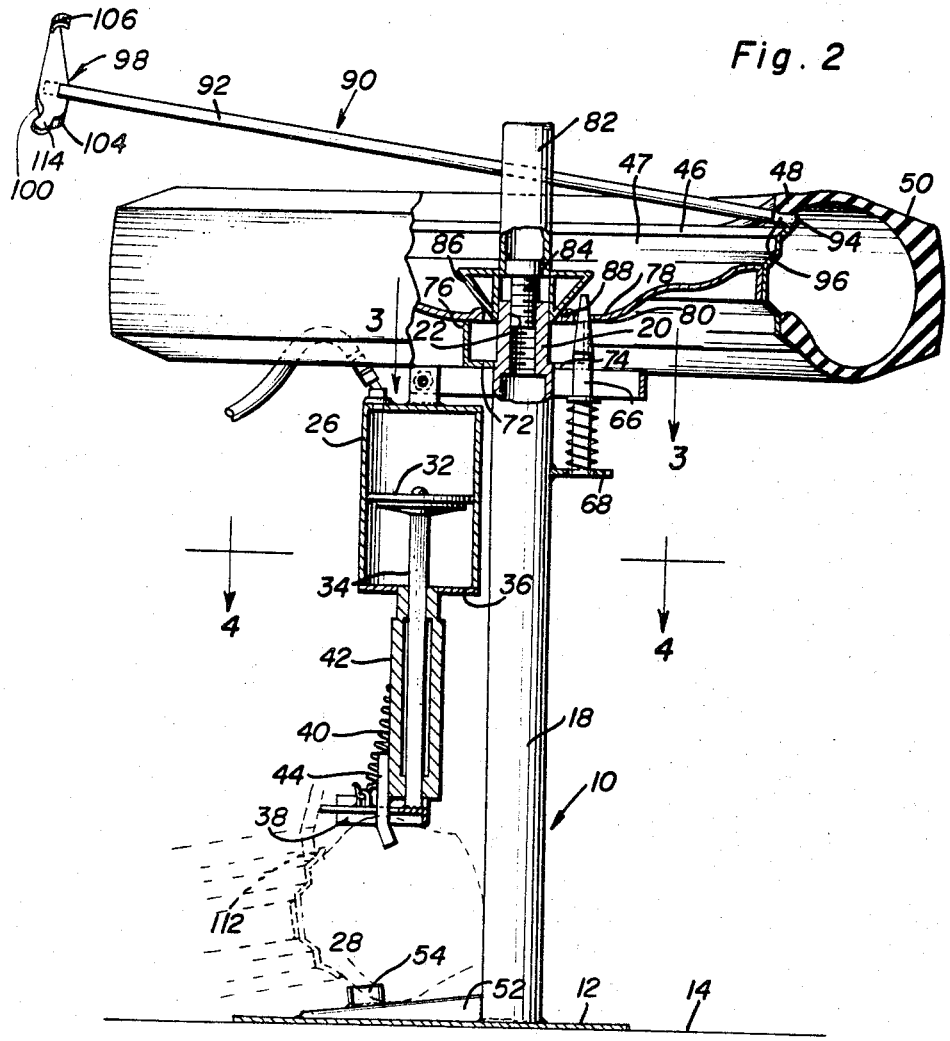
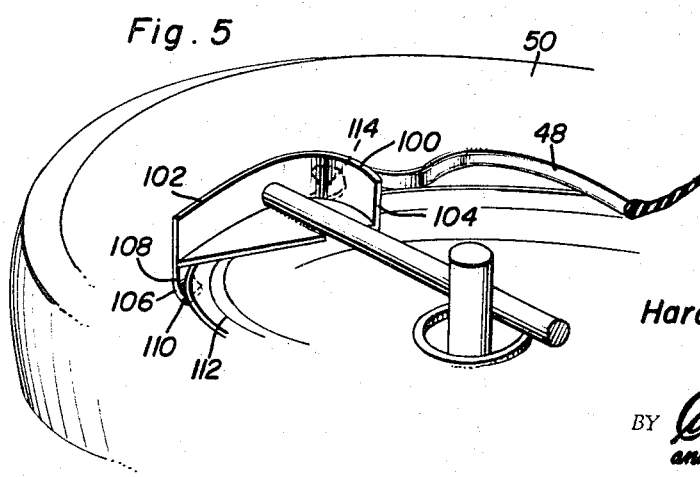
Harold W. Hilyard
INVENTOR.

United States Patent Office 3,416,588
Patented Dec. 17, 1968

3,416,588
TIRE CHANGING MACHINE
Harold W. Hilyard, Lima, Ohio, assignor to Marwood Enterprises Incorporated, a corporation of Ohio
Filed July 28, 1966, Ser. No. 568,490
1 Claim. (Cl. 157—1.17)

ABSTRACT OF THE DISCLOSURE

A tire changing machine includes an upright which supports a bead breaker mechanism in the form of a pneumatic cylinder operating in arcuate pressure foot and having a locator lug on the cylinder. The upper portion of the upright removably supports a holddown member and the upright also supports spring bias positioning pins for the wheel. A lever has a ball on one end and a head on the other end, the head having a flange with a tongue and L-shaped guide for installing a tire on a wheel.

---

This invention relates to a novel and useful tire changing machine and more specifically to a machine adapted to support a vehicle wheel having a tire casing mounted thereon in an elevated position above a supporting surface and in position fixed against movement relative to that supporting surface after the tire casing has had at least one bead portion thereof "broken away" from the corresponding flange portion of the associated vehicle wheel.

This tire changing machine is further provided with means for breaking one bead portion of a tire casing away from the corresponding flange of the vehicle wheel on which the casing is mounted prior to positioning of the vehicle wheel and tire casing in an elevated position on the tire changing machine.

Most present tire changing machines include an upstanding support on whose upper end a vehicle wheel rim having a tire casing mounted thereon is adapted to be supported in stationary position. After a wheel and its casing has been thus supported the operator of the machine usually removes the valve core so as to deflate the tire casing. Thereafter, the operator of conventional machines must reach down under the tire casing, grab a swingable clamp member, swing the clamp member up and into position above the tire casing, actuate the clamp member (which is usually pneumatically operated) to break the upper bead of the tire casing from the rim, and then swing the clamp back down into its stored position beneath the vehicle wheel.

The tire changing machine of the instant invention includes means for breaking the bead portions of a tire casing from the associated rim portion while the vehicle wheel and casing is supported on the ground beneath the machine after the valve core has been removed. Then, all that remains necessary is to lift the wheel and casing combination up onto the tire changing machine after which the wheel is then locked in position prior to removing the casing therefrom.

Accordingly, it may be seen that fewer operations are required by the operator of the tire changing machine of the instant invention and thus the tire changing operation may be more quickly accomplished.

The main object of this invention is to provide a tire changing machine which will reduce the number of individual operations which must be performed by the operator of the machine during the process of changing a tire.

Another object of this invention, in accordance with the preceding object, is to provide a means whereby the bead portions of a tire casing may be "broken away from" the corresponding portion of the associated vehicle wheel while the wheel and casing are disposed on the ground adjacent the tire changing machine.

Yet another object of this invention is to provide a tire changing machine which will have fewer operating components and which will therefore be less complicated to operate.

A final object of this invention to be specifically enumerated herein is to provide a tire changing machine in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the tire changing machine of the instant invention;

FIGURE 2 is a side elevational view of the tire changing machine illustrated with a vehicle wheel and tire casing mounted thereon and with portions of the machine and the wheel and tire casing being broken away and illustrated in vertical section;

FIGURE 3 is an enlarged horizontal sectional view taken substantially upon the plane indicated by the section line 3—3 of FIGURE 2;

FIGURE 4 is an enlarged fragmentary horizontal sectional view taken substantially upon the plane indicated by the section line 4—4 of FIGURE 2; and FIGURE 5 is a fragmentary perspective view of the upper portion of the tire changing machine illustrated with a vehicle wheel and tire casing supported therefrom and the lever bar portion of the instant invention being utilized to mount the tire casing on the vehicle wheel rim.

Referring now more specifically to the drawings the numeral 10 generally designates the tire changing machine of the instant invention. The machine 10 includes a base 12 adapted to be secured to any suitable supporting surface 14 by means of suitable fasteners 16 secured through the base 12 and anchored in the supporting surface 14.

The machine 10 includes a standard 18 which projects upwardly from the base 12 and includes a diametrically reduced upper terminal end portion 20 having a threaded bore 22 formed therein.

A pair of laterally outwardly projecting support arms 24 are secured to one side of the standard 18 and pivotally support between their free end portions the cylinder portion 26 of a pneumatic cylinder 28 by means of a pivot fastener 30. The cylinder portion 26 has a piston 32 slidably disposed therein having one end of a piston rod 34 secured thereto. The piston rod 34 is non-circular in cross-section and projects downwardly from the piston 32 and outwardly through a complementary non-circular opening formed through the lower end wall 36 of the cylinder portion 26 and has an arcuate pressure foot 38 secured to its lower end portion. The pressure foot 38 is disposed in a horizontal plane and is generally L-shaped in cross-section so as to be rigid. In addition, a pair of expansion springs 40 are secured between opposite end portions of the pressure foot 38 and opposite side portions of the cylinder portion 26 so as to yieldingly retract the piston rod 34.

A sleeve 42 is slidingly disposed on the end portion of the piston rod 34 projecting below the cylinder portion 26 and includes a downwardly projecting abutment and positioning lug 44 which is adapted to engage the radial outermost portion of the wheel rim 46 centrally disposed relative to the corresponding bead portion 46 of the tire casing 50 which is to be depressed by the pressure foot 38. In addition, the base 12 includes a wedge-shaped rest member 52 upon which the tire casing 50 is adapted to rest prior to the bead 48 being "broken away from" the rim portion 46. Still further, the rest 52 includes an upstanding positioning lug 54 with which the wheel 47 is adapted to be engaged for proper positioning of the wheel 47 relative to the pressure foot 38 so that downward movement of the latter will effect its engagement with the bead portion 48 of the casing 50 immediately adjacent the wheel flange 46 with which the bead portion 48 is engaged.

The standard 18 additionally includes a pair of support arms 60 and 62 which project outwardly from the side thereof remote from the support arms 24 and which are interconnected at their outer ends by means of a curved bight portion 64. The support arms 60 and 62 embracingly engage the upper end portion of a positioning pin 66 whose lower end is supported from an outwardly projecting arm 68 disposed below and in vertical alignment with the arms 60 and 62. Further, an upwardly opening cup-shaped member 70 including a bottom wall 72 slotted as at 74 to receive the pin 66 is secured to the diametrically reduced portion 20 of the standard 18. The cup-shaped member 70 additionally includes an upstanding slotted cylindrical wall portion 76. The cylindrical wall portion 76 is disposed in generally concentric relation with the terminal end portion 20 and is adapted to support the center web portion 78 of the wheel 47 with the upper end portion of the pin 66 projecting through one of the apertures 80 formed in the web portion 78 adapted to receive a wheel lug.

A holddown member 82 is provided and includes a threaded shank portion 84 which is threadedly engageable in the bore 22 and which is surrounded by an inverted truncated cone-shaped enlargement 86 adapted to be seated in the central opening 88 in the central web portion 78.

A pry bar generally referred to by the reference numeral 90 is provided for use with the machine 10 and comprises an elongated rod 92 including a ball-shaped end portion 94 defined by a diametrically reduced neck 96. The opposite end of the rod 92 has a head generally referred to by the reference numeral 98 mounted thereon including a transversely extending curved flange 100 including a first end portion 102 which is generally straight and a second end portion 104 which may be termed the nose end and which is sharply curved. In addition, the head 98 includes an L-shaped hook 106 including a straight leg portion 108 and a curved leg portion 110 adapted to curve beneath the upper radial outermost flange 112 of the wheel 47. Still further, the head 98 includes a tongue 114 which projects outwardly of the nose 104 and which is adapted to swing beneath the bead portion 48 and lift the latter above the flange 112 as the head 98 is moved about the wheel 47 in the manner illustrated in FIGURE 5 of the drawings, so that the straight or tail end 102 of the flange 100 may pry the bead portion 48 outwardly past the radial outermost extremities of the rim 112 for positioning beneath the latter as the pry bar 90 is forced about the upper end portion of the holddown member 82 which projects above the center web portion 78 of the wheel 47 when the latter is mounted on the machine 10 as illustrated in FIGURE 2 of the drawings.

In operation, a tire to be changed first has the valve core of the valve stem removed so as to deflate the casing 50. Then, the wheel 47 and casing 50 are positioned adjacent or possibly against the standard 18 in engagement with the positioning lug 54 so that the radial outermost flange 112 of the wheel 47 adjacent the standard 10 may be properly positioned, such positioning being checked by engagement of lug 44 with flange 112, relative to the lowermost position of the pressure foot 38 in order that the latter may move downwardly upon actuation of the cylinder assembly 28 and engage the bead portion 48 immediately adjacent the flange portion 112 so as to urge the bead portion downwardly away from the flange portion 112. After both bead portions 48 have been "broken away from" the flange portion 112, the wheel 47, with the tire casing 50 thereon, may be supported from the upper portion of the standard 18 in the manner illustrated in FIGURE 2 of the drawings.

Thereafter, the end portion 94 may be driven between the bead portion 48 and the rim 112 while the rod 92 is held in a position projecting upwardly and radially outwardly away from the outer periphery of the wheel 47. Then, the rod 92 may have its free end swung over the machine 10 to the position illustrated in FIGURE 2 of the drawings. Then, thrust may be manually applied to the head end of the rod 92 in a direction extending generally tangentially to the arc through which the head 98 swings while moving about the holddown member 82. After the bead portion 48 has been completely removed from behind the flange portion 122, the remaining bead portion of the casing 50 may be removed in a similar manner.

Then, the tire casing 50 may be repaired or exchanged for a new tire casing which may have its lower bead portion readily applied over the flange portion 122 in the usual manner. Thereafter, the bead portion of the new tire casing corresponding to the bead portion 48 may be reapplied behind the rim portion 112 in the manner illustrated in FIGURE 5 of the drawings with the tongue 114 sliding beneath the bead portion being applied and the tail end of the head 98 forcing the bead portion beneath the rim flange 112 as tangential forces are applied to the end of the rod 92 remote from the head 98 to cause the head 98 to swing about the outer periphery of a flange portion 112.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire changing machine comprising a combination;
   (a) a base,
   (b) an upright standard extending upwardly from the base,
   (c) laterally outwardly projecting support means having one end connected to the standard,
   (d) a pneumatic cylinder pivotally connected to the other end of the support means,
   (e) a piston rod of noncircular section connected to a piston within the cylinder and projecting downwardly,
   (f) an arcuate pressure foot on the lower end of the piston rod,
   (g) spring means connected between the pressure foot and pneumatic cylinder for retracting the piston rod and pressure foot,
   (h) a positioning lug extending downwardly from a sleeve surrounding the piston rod,
   (i) a rest with a positioning lug for supporting and positioning a wheel on the base under the pressure foot,
   (j) a support arm extending laterally from the standard and carrying a spring biased positioning pin,
   (k) a cylindrical wheel support member surrounding the upper end of the standard,
   (l) a holddown member with means for selectively engaging the upper end of the standard,
   (m) an inverted truncated cone shaped engaging element adapted to seat in a central opening of a wheel web and carried by the holddown member,
   (n) an elongated rod shaped pry bar,
   (o) a ball shaped portion on one end of the pry bar,
   (p) a head on the other end of the pry bar,
   (q) a flange on the head normal to the lever and curving inwardly at one side of the lever and being generally straight on the other end which projects to the other side of the lever,
(r) a generally plate-like tongue projecting generally radially outwardly of one longitudinal edge of the curved edge portion of the flange is being generally perpendicular to the plane of the flange,
(s) and a guide member on the other end of the flange in the shape of an L-shaped hook extension for guiding a bead of a tire casing onto the rim.

References Cited

UNITED STATES PATENTS

| | | | |
|---|---|---|---|
| 2,655,985 | 10/1953 | Henderson | 157—1.24 |
| 3,050,110 | 8/1962 | Lydle | 157—1.24 |
| 3,094,161 | 6/1963 | Moore | 157—1.17 |
| 3,100,011 | 8/1963 | Lydle | 157—1.22 |
| 3,104,695 | 9/1963 | McKinney | 157—1.22 |
| 3,247,883 | 4/1966 | Strang et al. | 157—1.22 |

GRANVILLE Y. CUSTER, JR., *Primary Examiner.*